US007569270B2

(12) United States Patent
Döhring

(10) Patent No.: US 7,569,270 B2
(45) Date of Patent: Aug. 4, 2009

(54) METHOD OF IMPREGNATING DECORATIVE PAPERS

(75) Inventor: Dieter Döhring, Lampertswalde (DE)

(73) Assignee: Kronospan Technical Company Ltd., Nikosia (CY)

( * ) Notice: Subject to any disclaimer, the term of this patent is extended or adjusted under 35 U.S.C. 154(b) by 290 days.

(21) Appl. No.: 11/018,325

(22) Filed: Dec. 21, 2004

(65) Prior Publication Data

US 2006/0134405 A1 Jun. 22, 2006

Related U.S. Application Data

(62) Division of application No. 09/647,129, filed as application No. PCT/EP99/00604 on Jan. 26, 1999, now Pat. No. 6,835,421.

(51) Int. Cl.
*B32B 5/66* (2006.01)

(52) U.S. Cl. .................... 428/323; 428/537.5; 427/202; 427/204; 427/205; 427/212; 427/261; 427/402; 427/407.1; 427/411

(58) Field of Classification Search ............. 428/537.5, 428/323; 427/402, 202, 204, 205, 261, 407.1, 427/411, 212
See application file for complete search history.

(56) References Cited

U.S. PATENT DOCUMENTS

| | | | |
|---|---|---|---|
| 2,958,593 A | 11/1960 | Hoover et al. | |
| 3,135,643 A | 6/1964 | Michl | |
| 3,798,111 A | 3/1974 | Lane et al. | |
| 3,968,291 A | 7/1976 | Chevallier | |
| 3,975,572 A | 8/1976 | Power | |
| 4,128,696 A | 12/1978 | Goebel et al. | |
| 4,322,468 A | 3/1982 | Raghava | |
| 4,505,974 A | 3/1985 | Hosler | |
| 4,940,503 A | 7/1990 | Lindgren et al. | |
| 5,034,272 A | 7/1991 | Lindgren et al. | |
| 5,142,151 A | 8/1992 | Varnell et al. | |
| 5,344,704 A | 9/1994 | O'Dell et al. | |
| 5,545,476 A | 8/1996 | O'Dell et al. | |
| 6,231,670 B1 | 5/2001 | Fischer et al. | |
| 6,290,815 B1 | 9/2001 | Magnin et al. | |
| 6,835,421 B1 * | 12/2004 | Dohring | 427/411 |

FOREIGN PATENT DOCUMENTS

| | | | |
|---|---|---|---|
| BE | 100 58 22 | | 2/1994 |
| DE | 2 149 250 | | 3/1972 |
| DE | 21 10 605 | | 9/1972 |
| DE | 2 362 645 | | 9/1974 |
| DE | 2 328 431 | | 1/1975 |
| DE | 3643742 | | 6/1988 |
| DE | 196 04 907 | | 8/1997 |
| DE | 196 43 742 | | 4/1998 |
| DE | 197 10 619 | | 9/1998 |
| EP | 0 136 577 | | 9/1984 |
| EP | 0136577 | * | 4/1985 |
| EP | 0 197 324 | | 3/1986 |
| EP | 0 200 906 | | 3/1986 |
| EP | 0 186 257 | | 7/1986 |
| EP | 0 329 154 | | 2/1989 |
| EP | 0329154 | * | 8/1989 |
| EP | 0 693 030 | | 4/1994 |
| EP | 0 732 449 | | 9/1996 |
| EP | 0 875 399 | | 11/1996 |
| GB | 1348272 | | 3/1974 |
| GB | 1378879 | | 12/1974 |
| GB | 1464014 | | 2/1977 |
| JP | 03136807 | | 6/1991 |
| JP | 07001414 | | 1/1995 |
| WO | 88/04707 | | 6/1988 |
| WO | 93/17182 | * | 9/1993 |
| WO | 98/17863 | | 4/1998 |
| WO | 98/41409 | | 9/1998 |
| WO | 98/47706 | | 10/1998 |
| WO | 99/50501 | | 10/1999 |

OTHER PUBLICATIONS

Database WPI, Section Ch, Week 8138, Derwent Publications Ltd., XP002102423 & JP 56 095928 A (Matsushita Electric Works Ltd), Aug. 3, 1981, see abstract.

Database WPI, Section Ch, Week 9214, Derwent Publications Ltd., London, GB; AN 92-111433, XP002102424 & JP 04 057679 A (Yasuda H), Feb. 25, 1992, see abstract.

* cited by examiner

*Primary Examiner*—Leszek Kiliman
(74) *Attorney, Agent, or Firm*—Renner, Otto, Boisselle, & Sklar, LLP

(57) ABSTRACT

A method for impregnating decorative papers which are used for producing highly abrasion-proof laminate floor materials. The decorative paper is firstly moistened with an amino resin and is thus impregnated. The amount of resin applied is controlled using dosing rollers. In addition, a layer comprised of an amino resin is sprayed with a special dispersion onto the moistened decorative paper. The final mass per unit area with regard to the dry mass of the base paper ranges from 100% to 250%.

3 Claims, No Drawings

METHOD OF IMPREGNATING DECORATIVE PAPERS

This application is a divisional of U.S. patent application Ser. No. 09/647,129 filed Nov. 27, 2000, now U.S. Pat. No. 6,835,421 which is a national phase of International Application No. PCT/EP99/00604 filed Jan. 26, 1999, all of which are hereby incorporated herein by reference in their entireties.

The invention relates to a method of impregnating decorative or patterned papers used for the production of highly wear-resistant laminate flooring materials, in which the decorative paper is first moistened and impregnated with an amino resin as well as the resin content being regulated in this step It is known (patent of Graudenz et al.), to produce highly wear-resistant decorative paper impregnates for laminate flooring materials. In this known process, after the actual impregnation, there is applied to the patterned paper a mass in which the particulate corundum is held relatively stable by special viscosity-increasing substances in a dispersion forming the mass.

In this arrangement the mass is applied by means of spreading rollers still in the wet phase directly after the impregnation or alternatively in an intermediate drying stage.

In this known technology making use of spreading rollers the corundum-containing mass is present in reservoir vessels in which there are formed dead zones, in which there is little movement of the mass. Accordingly the corundum particles settle out, which has the consequence of a lack of homogeneity in the application of the corundum to the paper and thereby substantial variations in the wear resistance values of the resulting laminate flooring materials.

For this reason hitherto viscosity-increasing substances, as a rule cellulose derivatives, have been added to the mass containing the corundum mixture. Furthermore the corundum should be relatively fine, as the lighter or finer corundum particles are less rapidly precipitated. However the introduction of cellulose derivatives leads to an optical dulling of the surface of the laminate flooring materials produced.

The finer the particle size of the corundum, the more must be the proportion of it applied to the decorative paper in order to achieve sufficient wear resistance. Also this results in a dulling of the surface of the materials produced.

The invention is based on solving the problem of avoiding the above-mentioned drawbacks of the known manufacture of highly wear-resistant laminate flooring materials and to be able to produce highly wear-resistant decorative laminate flooring materials, the decorative paper which exhibits the surface structure being at the same time coated with particulate corundum without the surface of the flooring materials thus produced showing any dulling.

This problem is solved according to the present invention by a process having a features of the independent Claim 1.

Preferred embodiments and further features of the invention are the subject of the dependent claims.

One of the important differences of the process according to the invention lies in the fact that the mass or dispersion used for impregnating the decorative paper and for applying the wear-resistant bodies such as corundum particles is sprayed on or applied by the nozzle principle.

The nozzle principle has the advantage over application by rolling that the dispersion containing the wear-resistant bodies such as corundum particles is continuously and thoroughly stirred around before application and thereby is more or less uniformly moved. Accordingly appearances of deposits which lead to a lack of uniformity are not observed. Therefore also one can dispense with the addition of viscosity-increasing materials or substances. On the contrary in fact one can introduce flow-promoting materials which achieve an improved distribution of the wear-resistant material such as corundum, which is of advantage in the press used for compressing the material.

A further advantage lies in the fact that one does not need to pay particular attention to using aluminium oxide of a particularly fine particle size, but that corundum or other particulate wear-resistant material having a significantly larger or coarser particle size can be employed. This has the further consequence that relatively small quantities of corundum or other particulate wear-resistant material are required in order to achieve high values of wear-resistance.

The consequence of these measures and advantages is that particularly transparent and brilliant surfaces of laminate flooring materials can be achieved according to the invention.

A further advantage of the invention lies in the fact that one does not, as in the known application of the mass or dispersion used for impregnation by means of spreading rollers, have to proceed with a relatively slow impregnation velocity of for example 18 to 25 m/min, in order to achieve an adequately uniform application, but that using the process according to the invention, in which the mass or dispersion is supplied by means of nozzles, one can be achieve or realise impregnation velocities of 40 to 50 m/min.

The invention is further explained in the following in conjunction with embodiments by way of example.

EXAMPLE 1

A special dispersion is first pre-nixed in a reservoir vessel having stirring means. Stirred into this are 200 kg melamine resin (Kauramin soaking resin 786 from Messrs BASF), 10 kg water, 1.5 kg of a wetting agent, 0.4 kg of a separating agent and 1.5 kg hardener (H 527 from Messrs BASF). Then there is added 80 kg. corundum having a mean particle size of 135 μ-m. After 10 minutes of stirring 25 kg of $\epsilon$ caprolactam and 0.9 kg of a commercially available silane adhesion promoter are added.

A standard impregnating channel made by Messrs VITS is provided following the impregnating means with feed-in means comprising a wide roller, a direction-reversing roller, a nozzle gap with receiving vessel, a pair of metering rollers as well as wire supporting rollers.

A decorative or patterned paper web having a density of 70 $g/m^2$ is fed through the impregnating equipment and the additional structure. In the standard impregnating equipment an initial resin take-up of 75 $g/m^2$ (obtained after drying) is set. When this value is reached the nozzle is set in operation and the special dispersion is applied. Through the second pair of metering rollers a final mass of 155 $g/m^2$ is set. The paper treated in this way is conducted through a drier at a speed of 45 m/min. The residual moisture content amounts to 6.1%.

The decorative or patterned paper is subsequently pressed in a short stroke press to form an HDF supporting plate (pressing temperature 180° C., pressing time 20 s). There is obtained a brilliant surface which fulfils the requirements of pr-EN 13329 and has a wear-resistance value of IP 12,000

EXAMPLE 2

Like Example 1. Instead of corundum, particulate silicon carbide having a mean particle size of 125 μ-m is used. A dark-coloured decorative paper is employed.

EXAMPLE 3

Like Example 1. However instead of corundum there is used a mixture of 75% aluminium oxide having a mean particle size of 125 μ-m and 25% silicon carbide having the same mean particle size.

What is claimed is:

1. A laminate panel made in accordance with a method comprising:

taking paper;

damping and impregnating the paper with an amino resin by the use of metering rollers;

additionally spraying onto the damped wet paper an additional layer of amino resin in a dispersion containing abrasive particles and flow-promoting materials that improve the distribution of the particles in the additional layer; wherein the final area density relative to the dry mass of raw paper amounts to 100% to 250%; and pressing the impregnated paper to form the laminate panel.

2. A laminate panel according to claim 1, wherein the impregnated paper is dried after spraying and before pressing.

3. A laminate panel made by using a damped wet paper with an additional layer produced by spraying onto the damped wet paper an amino resin in a dispersion containing abrasive particles, such that the particles are uniformly dispersed in the additional layer; and the damped wet paper with the additional layer thereon is used to form the laminate panel.

* * * * *